United States Patent [19]
Osann, Jr.

[11] 3,937,903
[45] Feb. 10, 1976

[54] SOUND TRACK SELECTOR SYSTEM FOR PHONOGRAPH RECORD PLAYERS

[76] Inventor: Robert Osann, Jr., 6725 Mariposa Ave., Citrus Heights, Calif. 95610

[22] Filed: Apr. 29, 1974

[21] Appl. No.: 464,927

[52] U.S. Cl............... 179/100.4 D; 179/100.3 V; 179/100.4 A; 274/15 R; 360/72
[51] Int. Cl.² .................................. G11B 19/14
[58] Field of Search ............ 179/100.4 A, 100.4 D, 100.3 V; 274/15 R; 250/566; 360/72, 78, 86

[56] References Cited
UNITED STATES PATENTS

| | | | |
|---|---|---|---|
| 2,952,464 | 9/1960 | Stimler | 179/100.4 D |
| 3,368,080 | 2/1968 | Nakagiri et al. | 274/15 |
| 3,566,132 | 2/1971 | Walker | 360/74 |
| 3,662,363 | 5/1972 | Chertok | 179/100.4 D |
| 3,689,079 | 9/1972 | Matsuda et al. | 179/100.4 D |
| 3,701,534 | 10/1972 | Laue | 274/15 R |

Primary Examiner—James W. Moffitt
Assistant Examiner—Stewart Levy

[57] ABSTRACT

A sound track selector system for a phonograph record player is provided comprising a light emitter and light detecting sensor carried beneath a sound stylus pick-up arm, directing light to the face of a phonograph record and receiving reflected light along axes substantially perpendicular to the record face and substantially parallel to one another as the emitter and sensor scan the record, means connected to the sensor for determining the bands between recorded sound in response to reflected light, and means for controlling the position of the pickup arm in response to preselected portions of the recording in relation to the detection of the unrecorded portions of the record. An optical encoder system is also provided for detecting the peripheral positions of the pickup arm with respect to the phonograph record.

12 Claims, 9 Drawing Figures

SOUND TRACK SELECTOR SYSTEM FOR PHONOGRAPH RECORD PLAYERS

BACKGROUND OF THE INVENTION

The desirability of preselecting one or more specific renditions from a multiple-program long-playing phonograph record, such as a 33⅓ rpm L/P record, has long been recognized. This applies whether the phonograph record comprises a series of independent musical or literary, or other types of renditions, only a portion of which may appeal to the listener or only a part of which meets the purpose for which the rendition may be selected. It also applies to both home use and commercial use, including broadcasting, of phonograph records.

The manual selection of such renditions is obviously totally unacceptable, since it is imprecise and results in damage to the record and to the phonograph stylus.

The most standard form of L/P phonograph record is designed for 33⅓ RPM operation and usually comprises from about 5 to 7 renditions per side for popular music and a lesser number per side for classical music. In any event, the renditions may vary in length of time and number per side of each record for any particular purpose.

Such records are usually composed of a black vinyl or other polymeric material which readily reflects light. They are usually pressed from a master die which impresses on a polymeric record blank convoluted grooves carrying a sound track emanating from the outer periphery of the record and terminating near, but spaced from its center. When a multiplicity of renditions are included on one side of the record, each such rendition is spaced from the next by a small band containing an unmodulated groove to direct the stylus of the phonograph thereacross from the preceding rendition, represented by a band of sound modulated grooves, to the next band of sound-modulated grooves. The space between the sound-modulated grooves, however, is much more responsive to the reflection of light than is the band represented by the sound-modulated grooves, thereby enabling the sensing of successive bands of sound-modulated grooves, and through appropriate means, the programming of a record player to select any one or more of such bands for reproduction.

One approach to the solution of this programming problem is represented by U.S. Pat. No. 2.952,464 to Stimler which utilizes a source of light and a photoelectric cell to detect the respective bands on the record, but which requires an auxiliary optical system including lenses wherein the source of light and reflected light are directed and reflected at angles of about 45° to and from the record surface. An elaborate system of relays and switches is also employed to accomplish the desired control of the pickup arm.

The deficiencies of the system provided by Stimler are more fully pointed out in U.S. Pat. No. 3,368,080 to Nakagiri, which teaches the use of a photoelectric cell and a light emitting device, but nevertheless together with a conventional optical system, which still do not achieve the precision required, in an economical manner, for an effective system in accordance with the purposes of this invention.

BRIEF SUMMARY OF THE INVENTION

In accordance with the present invention, the deficiencies of the prior art are overcome by providing an apparatus and system for preselecting specific desired bands of sound-modulated grooves of a phonograph recording and enabling the same to be played on a phonograph in accordance with such selection in a more precise and economic manner than provided by the prior art. A system for accomplishing this result is shown by a schematic block diagram in FIG. 1, which will be more fully described.

More specifically, the invention comprises the use of a light emitting diode (L.E.D.) which preferably emits light in the infrared range of the spectrum, and a phototransistor sensor which receives substantially all wavelengths of light, both being carried by the pickup arm of a phonograph as it scans a phonograph record. These are schematically indicated as "EMITTER" and "SENSOR" in FIG. 1.

The scanning means (consisting of an emittor and sensor) operates in a reflective mode, wherein light radiation is emitted and the reflected light is received by the sensor along axes which are preferred to be substantially perpendicular to the faces of the emitting and sensing device and record face and substantially parallel to one another. It has been found that the unrecorded portions of the average phonograph record (between bands of modulated sound) reflect about twice as much light along an axis perpendicular to the record surface as do the bands of recorded or modulated sound. This facilitates the more efficient use of light as a means of sensing the respective bands of recorded sound. A particularly useful scanning device in accordance with this invention is a combined light emitting diode (L.E.D.) and phototransistor manufactured by Monsanto Electronic Special Products under the trademark "OPTOISOLATOR," which emits light in the infrared region of the spectrum, but which detects or senses light in substantially all ranges of the spectrum.

Figure 1:
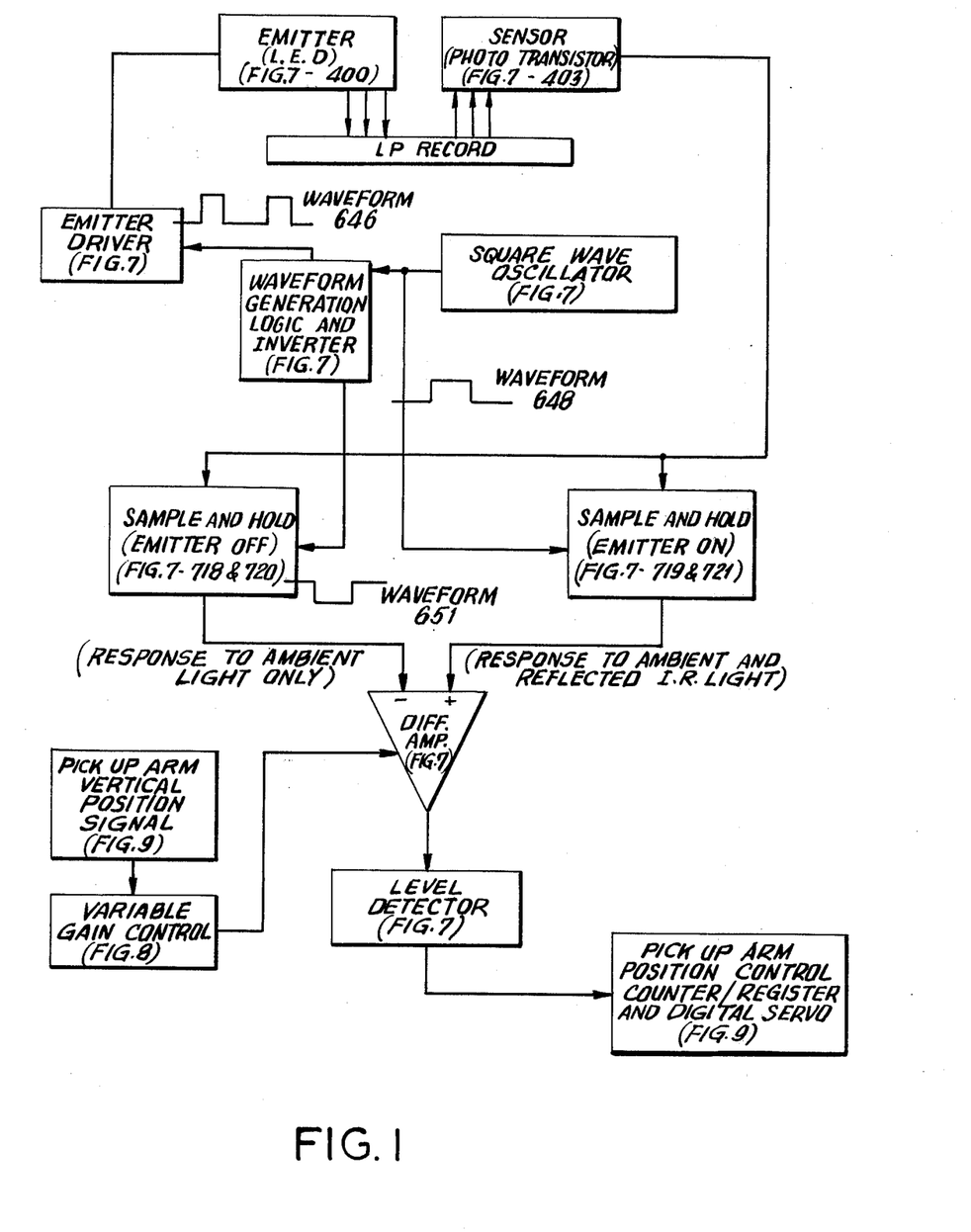
FIG. 1 is an electronic block diagram, schematically illustrating a preferred system according to this invention.

Referring more specifically to FIG. 1, the (L.E.D.) emitter is alternately turned on and off, while the output of the sensor, which is always operative, is alternately fed to each of two sample-and-hold circuits. At any given time, one sample-and-hold circuit will have a voltage representing only the sensor's response to ambient light, while the other circuit will have a voltage representing the sensor's response to both ambient light and the infrared light which has been reflected by the surface of the record. The emitter and the two sample-and-hold circuits are pulsed by a square wave oscillator in conjunction with a wave form generation logic and inverter circuit which generate wave forms (WF) 648,646 and 651 shown in FIG. 1 and later in FIG. 6. The respective outputs of the two sample-and-hold circuits are then fed to a variable gain differential amplifier where the smaller voltage (represented by ambient light) is subtracted from the larger (represented by ambient light plus reflected infrared light). This removes the effect of ambient light. The gain is controlled by a signal which changes with the pickup arm's vertical position (FIG. 8). The output of the differential amplifier represents the intensity of the reflected light which reached the sensor after being emitted by the L.E.D. The amplifier output is then fed into a level detection circuit (FIG. 7), where it is determined if the light was reflected by a soundmodulated band or by an unrecorded portion between the modulated bands. The output of the level detection circuit can then be used as the feedback element in a servo-loop that positions the pickup arm of the turntable (FIG. 8). This output signal, which indicates that the pickup arm is positioned between bands of recorded sound, is also fed into a counter which keeps track of which bands of recorded sound are behind or ahead of the pickup arm as it sweeps its arc and scans the record. The counter is constantly compared with a register which is programmed by a keyboard on the turntable which replaces the usual controls. A pickup vertical position signal varies the gain of the differential amplifier in accordance with the height of the pickup arm.

The foregoing system allows the turntable to be programmed by the user to automatically play any one, or any combination of bands of recorded sound on a record.

Other objects, features and advantages of this invention will become apparent from the following more detailed description, taken in conjunction with the following drawings.

DESCRIPTION OF THE PREFERRED EMBODIMENTS

A block diagram of the system employed in accordance with the preferred embodiment of this invention has been generally described in connection with FIG. 1, to which further reference should be made in connection with the following more detailed description of the invention.

Figure 2:
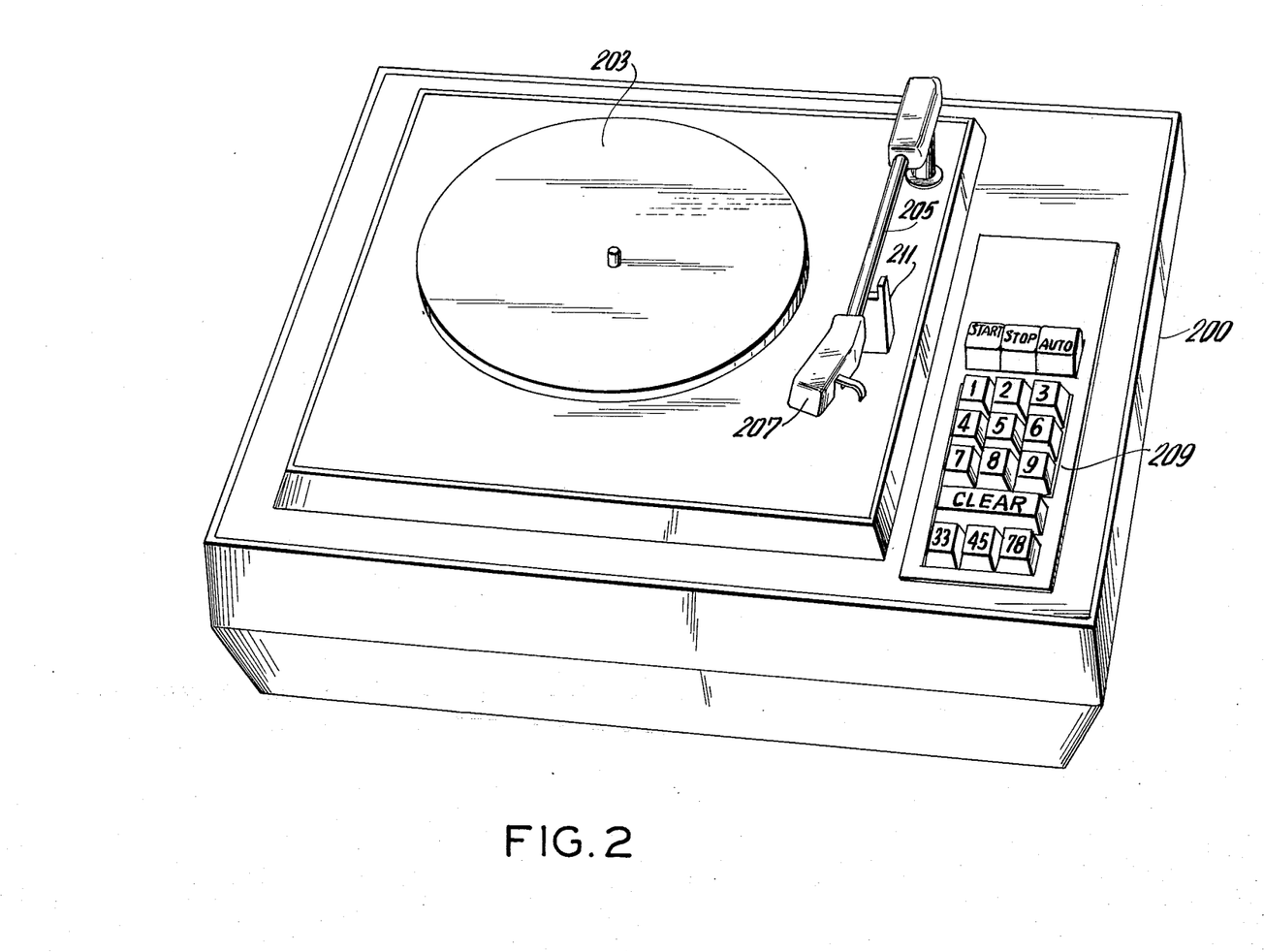
FIG. 2 is a front elevation, in perspective, illustrating a record player with automatic controls according to this invention.

FIG. 2 illustrates a record player characterized by a housing 200 and supporting a rotatable turntable 203. The record player is provided with a pick-up arm 205 and pickup head 207 carrying a stylus (not shown in FIG. 2) for sweeping the record and detecting recorded sound in the usual manner. The conventional controls, however, are dispensed with and replaced by a push button key-board generally indicated at 209, to provide automatic preselection of the renditions the listener desires for any particular record. Thus, the selector unit is provided with a series of push buttons, shown as ranging from 1 to 9 (but could be any other appropriate number), representing the number of specific selections which appear in consecutive order on a particular recording. Accordingly, the operator would first push the "clear" button to reset the program circuits to permit pushing buttons corresponding to any of the numbered selections desired, and thereafter the "start" button. If the playing of all selections is desired, the "AUTO" button is pushed. The "STOP" button of course, stops the machine and returns the pick-up arm to a position of rest on support 211.

Figure 3:
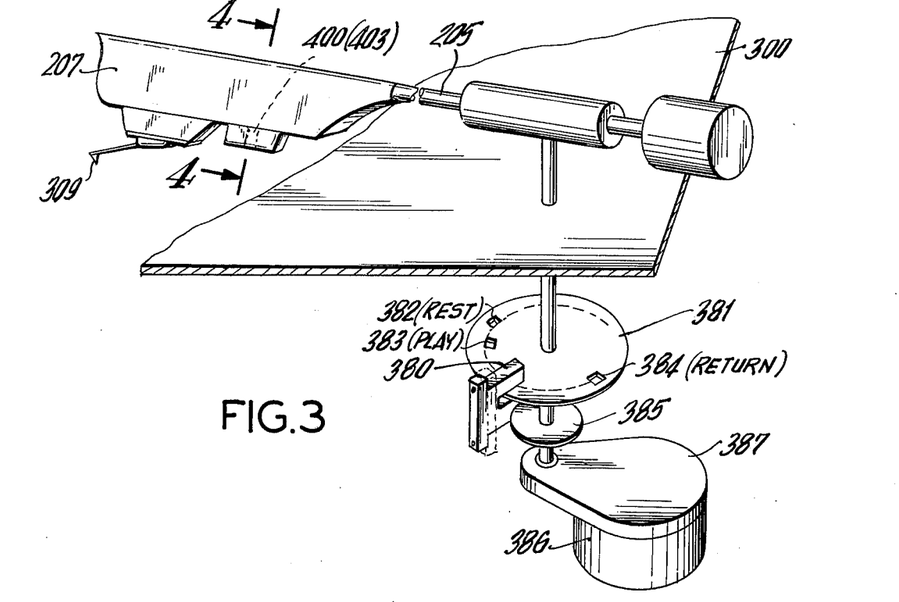
FIG. 3 is a schematic elevation, in perspective, illustrating a pick-up arm and turntable control system according to this invention.
Figure 4:
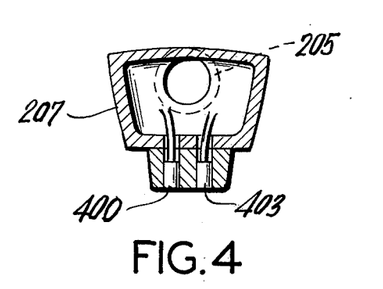
FIG. 4 is a section taken along line 4—4 of FIG. 3.

Referring to FIGS. 3 and 4, and particularly to FIG. 4, the emitter 400 and sensor 403 are carried by the pick-up head 207 adjacent the pick-up cartridge and stylus 309. These consist, in the case of emitter 400, of a light-emitting diode (L.E.D.) which emits light substantially in the infra-red region of the spectrum, and a sensor 403 which is capable of detecting light in substantially all regions of the spectrum, including ambient light.

The light emitting and sensing devices may be transversely aligned, as shown in FIG. 4, with respect to pick-up arm 205, or if desired, re-oriented 180° to be axially aligned with respect to pick-up arm 205 and pickup head 207 without adverse results. This, however, depends in part upon the distance between the emitter and sensor in relation to the space between unrecorded bands on the record in order to achieve maximum response. Generally, when the emitter and sensor are oriented as in FIG. 4, (which is radial with respect to the record surface) the distance between the emitter 400 and sensor 403 should preferably be spaced apart no more than about two to three times the average width of unrecorded bands between the sound-modulated bands on the record. The emitter-sensor unit should advantageously be located as close to the the cartridge-stylus as possible for most precise control.

It has been found that the type of servo best suited to the application of a programmable turntable is not a true servo in the analog sense, but is instead, a completely digital, incremental, stepping system. As shown schematically in FIG. 3, the pick-up arm is rotated by a pulse-motor 386 which is geared down, through a gear train housed in 387, sufficiently to give the necessary incremental resolution. The pulse-motor is capable of being stepped at a high rate (20–80 pulses/sec. or more), making the pickup arm appear to glide across the record in a continuous motion when the increments of movement are appropriately small. Each increment, however, is dependent on a logic statement which includes not only a stepping rate drive signal, but also the resultant output of the programming circuitry combined with the signal from the level detector circuit shown in FIGS. 1 and 7. According to this logic statement, the stepping rate drive signal, having the characteristics of a clock, will cause the motor 386 to advance until a space between bands of recorded sound is detected, at which time a counter (FIG. 9) advances. If this new count (representing a specific band of recorded sound) happens to be identical to the number contained in a program register (FIG. 9), representing the next band of recorded sound desired and programmed by a push button, then the signal which activates the stepper motor drive transitors (FIG. 7) will be disabled, and the pickup arm lowering and release circuit will be activated.

Figure 5:
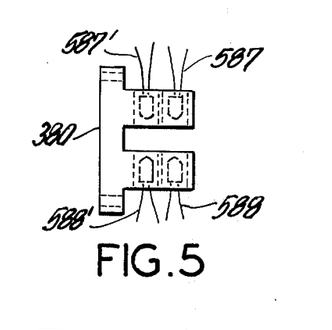
FIG. 5 is a schematic elevation of the emitter-sensor 380 of FIG. 3.

A novel way of positioning the pickup arm in its peripheral and intermediate positions is shown in FIGS. 3 and 5. A thin slotted disc 381 is affixed to the pick-up arm rotational shaft, below the turntable platform 300. Three positions of the pickup arm, i.e. rest, play and return, are detected by an optical encoder assembly generally indicated at 380 which consists of a pair of L.E.D. 's 587 and 587' and a corresponding pair of phototransitors 588 and 588', this time used in the transmissive mode. The outputs of photo-transitors 588 and 588' are fed into the previously mentioned digital positioning circuit (FIG. 9) where they are decoded. These three, "rest, play and return" positions are controlled by slots in disc 381 which will not change from record to record. Slot position 384 determines the point at which the pick-up arm will begin its return after its arc has been completed. Slot position 382 represents the location of the pickup arm at rest. The pickup arm will move to this position (382) following the detection of slot 384, which causes reversal of the reversible pulse-motor 386. Slot 383 represents the point at which the pickup arm 205 is in a position to play the first band of a recording, subject to programming and the sensing and control means which may then release and lower arm 205 to play the programmed selections.

As indicated in FIGS. 3 and 5, slots 382, 383 and 384 are so positioned from the axis of rotation of disc 381 that slot 382 may upon rotation of disc 381, become aligned with L.E.D. 587' and photo-transistor 588'; slot 383 with L.E.D. 587 and photo-transistor 588; and slot 384 with both L.E.D.'s 587 and 587' and photo-transistors 588 and 588'. The encoder's output signal, when actuated by slot 383, will therefore supplement the level detector output signal in the pickup arm drive logic circuit when the number in the program register (FIG. 9) is one. This eliminates the elaborate optical detection techniques of the prior art for detecting the peripheral bands of a record.

Also shown in FIG. 3 is a clutch mechanism 385 which engages and disengages the pulse-motor from the pickup arm rotation shaft. This clutch is advantageously activated by a solenoid 967 (shown in FIG. 9) which raises the pickup arm in the usual manner.

Figure 6:
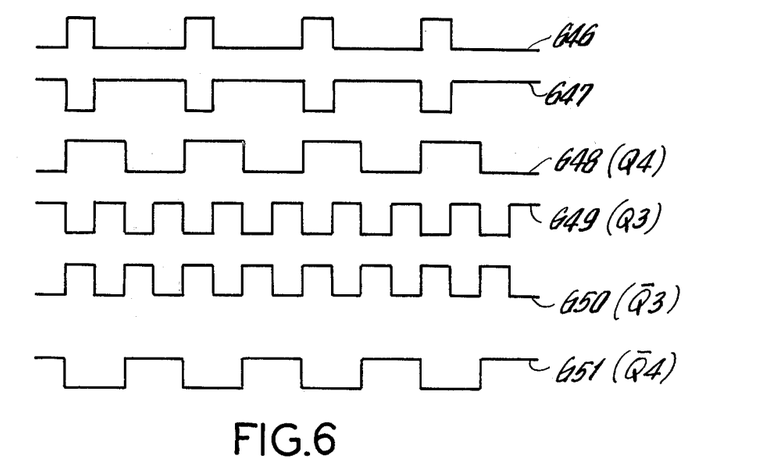
FIG. 6 is a graphic representation of various wave forms characteristic of those employed in accordance with the preferred embodiment and shown in part in FIG. 1.
Figure 7:
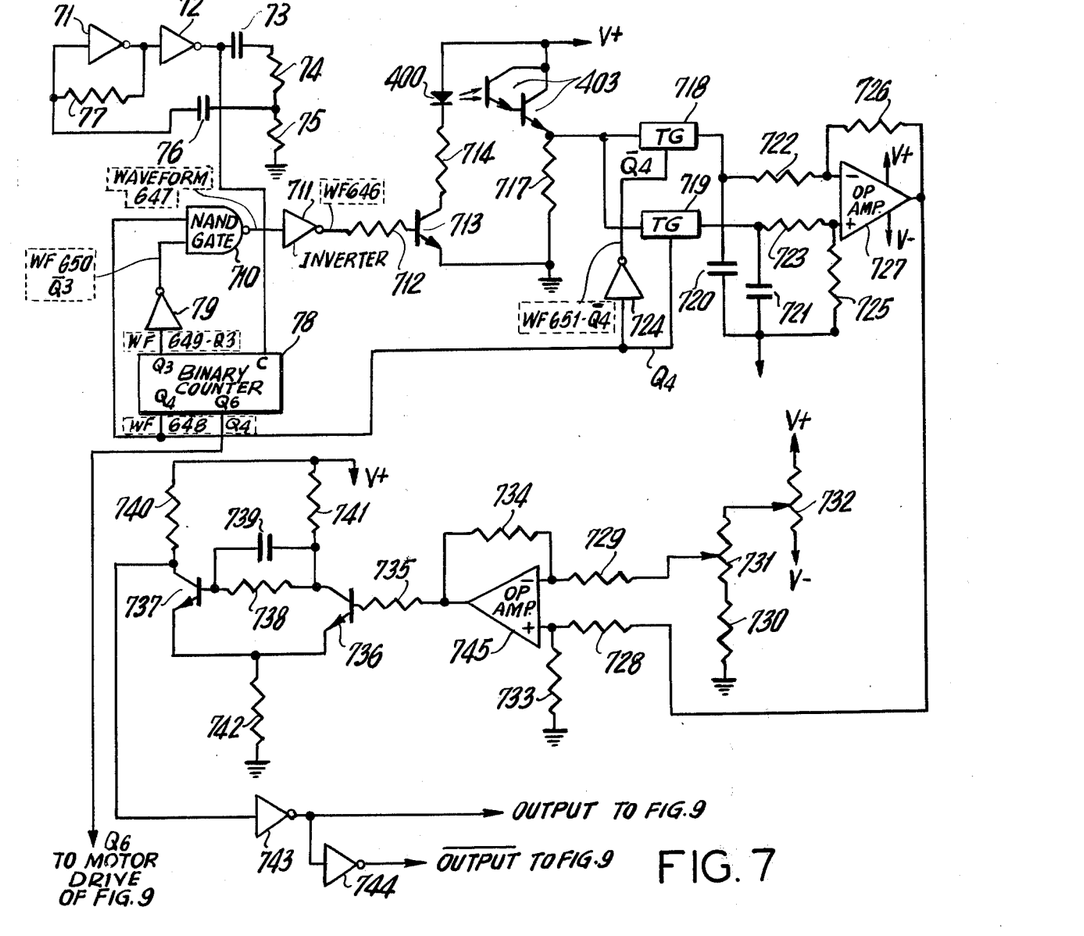
FIG. 7 is an electrical schematic diagram illustrating more specifically circuits utilized in FIG. 1.
Figure 8:
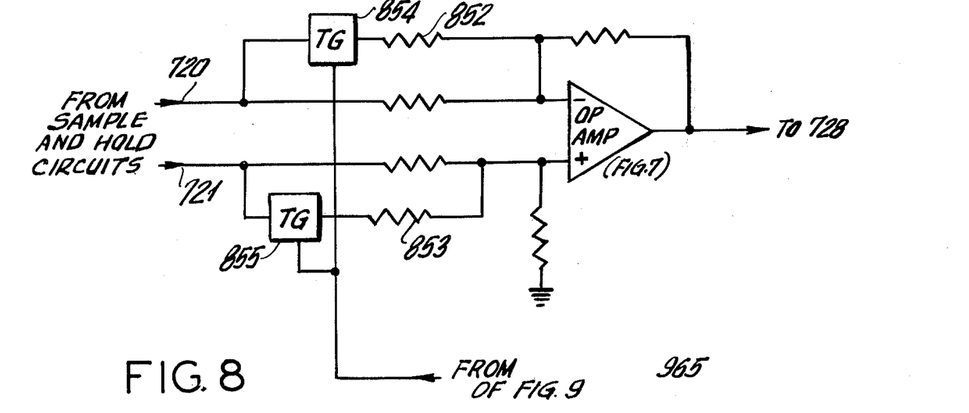
FIG. 8 is an electrical schematic illustrating modifications of the invention in conjunction with FIG. 7.

FIG. 7 shows a detailed schematic of a functional sensing circuit, the output of which indicates when the pickup arm is positioned above an unrecorded portion of a record. The relative position of the various waveforms utilized and shown in FIG. 6 are indicated on FIG. 7 as "WF" followed by the appropriate number. The light-emitting diode 400 and sensor 403 (otherwise known as a photo-Darlington) constitute the emitting and sensing devices which are mounted on the underside of the pickup arm. Resistor 714 controls the current through the L.E.D. when transistor 713 is saturated. Resistor 712 controls the base current to this transistor. Inverters 71 and 72 along with components 73, 74, 75, 76 and 77 comprise an oscillator whose output (approximately 1.6 khz) is connected to the clock input of a binary counter 78 which is used as a frequency divider. It should be noted here that although the digital components shown in this application are substantially of C-MOS technology, other types of logic circuitry could be used with appropriate changes. Also, although specific frequencies are shown, others might be used without departing from the spirit and scope of this invention. Outputs $Q_3$ and $Q_4$ are shown graphically in FIG. 6 as waveforms 649 (about 200 hz) and 648 (about 100 hz) respectively. The output of inverter 79 is $Q_3$ which is a waveform 650 of FIG. 6. The output of NAND gate 710 is waveform 647 of FIG. 6 and the output of inverter 711 is shown as waveform 646 of FIG. 6. This final waveform 646 turns on the L.E.D. when the logic level is "high."

Referring further to FIG. 7, resistor 717 acts as the load for the sensor (photo-Darlington) 403, whose output goes to two F.E.T. transmission gates 718 and 719. Transmission gate 719 is enabled by output $Q_4$ and passes the sensor output to holding capacitor 721 during and after the time the L.E.D. 400 is activated. The pulse 646 which activates the L.E.D. 400 ends before the sampling pulse 648 to allow for the relatively slow fall-time of the sensor (photo-Darlington) 403. (Other more fast acting photo transitors may obviate this problem). With the circuit as shown, the sensor output will have dropped to the appropriate level for the next sampling period by the time that period begins. This next sampling period occurs when $Q_4$ (waveform 651 of FIG. 6) is "high." $Q_4$ (wave-form 651) is the output of inverter 724 and enables transmission gate 718 during the time the L.E.D. 400 is off, allowing the voltage at the output of sensor 403 to be stored on capacitor 720. At this stage, both holding capacitors carry a voltage proportional to the ambient light detected by the sensor 403, while only capacitor 721 carries the additional voltage due to the light which was emitted by the L.E.D. 400 and reflected off the face of the record. Resistors 722, 723, 725 and 726 along with op-amp 727 form a differential amplifier which substracts the voltage on capacitor 720 from the voltage on capacitor 721. The output of this amplifier is therefore proportional only to light which is reflectively coupled from the L.E.D. 400 to the sensor 403. This signal is passed on to the non-inverting input of another differential amplifier (formed by resistors 728, 729, 733, 734 and op-amp 745). The inverting input of this amplifier is connected to a variable voltage source (resistors 730, 731 and 732). The output of this voltage source is set so that the output of the amplifier is approximately zero when the pickup arm is over a band of recorded sound. This output will therefore go to a positive level when the pickup arm is positioned above a more reflective unrecorded portion of a record. The resulting signal is fed into a Schmidt-trigger circuit consisting of transistors 736 and 737 along with components 735, 738, 739, 740, 741 and 742. This circuit acts as a level detector, and its threshold is set so that its output (the collector of transistor 737) goes "high" only when the pickup arm is positioned above an unrecorded portion of the record. This output is directed to inverters 743 and 744 which act as buffers between the Schmidt-trigger and the control circuit of FIG. 9. Output $Q_6$ of the binary counter 78 of FIG. 7 has a frequency of about 25 hz and is used in the circuit of FIG. 9 to actuate the pulse-motor 386 through its drive circuitry.

FIG. 8 shows a preferred design to compensate for variations in the intensity of reflected light picked up by the sensor 403 as it approaches the record. It consists of a variable gain differential amplifier which can be built around op-amp 727 of FIG. 7 and controlled by the output of NAND gate 965 of FIG. 9. This amplifier has two additional input resistors, 852 and 853, which are connected in parallel with the original input resistors whenever transmission gates 854 and 855 are enabled. This would occur when the pickup arm raising mechanism is actuated, and would increase the gain of the amplifier by reducing the net input resistance, thereby increasing the ratio of feedback resistance to input resistance. This compensates for variations in reflected light intensity when the pickup arm and sensor are raised or lowered.

Figure 9:
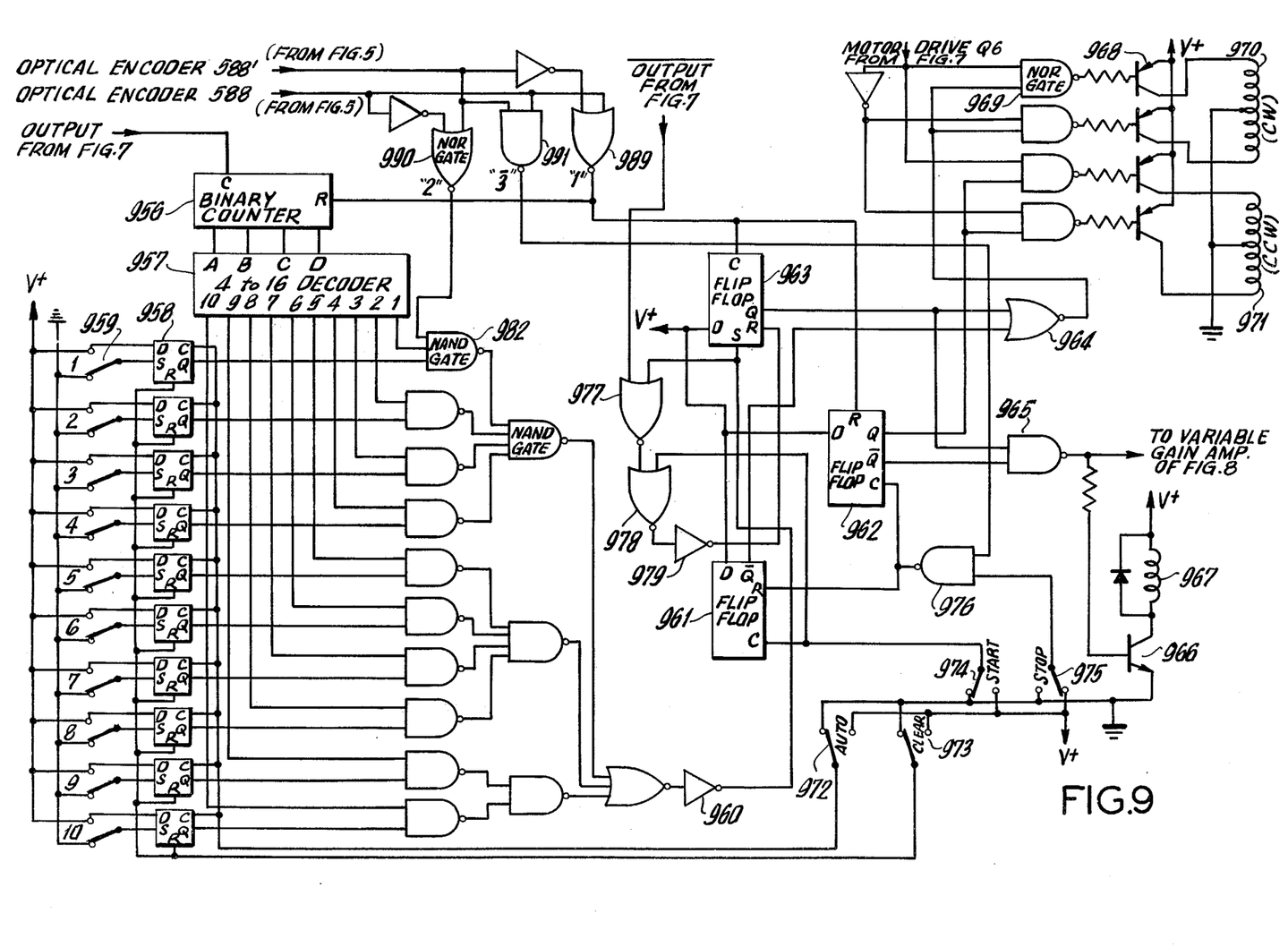
FIG. 9 is an electrical schematic illustrating a system for pick-up arm control and positioning according to this invention.

FIG. 9 shows a preferred design for a digital control system which positions the pickup arm in accordance with the foregoing description. In FIG. 9 the flip-flop circuits are of the D-type wherein D refers to data input, C to clock, S to set of output, R to reset and Q to output. Initially, the turntable is in a stopped condition with the pickup arm in a state of rest which is registered by slot 382 in FIG. 3 when it is on the pickup arm rest. The clear button 973 of FIG. 9 and FIG. 2 is then pushed which causes ten D type flip-flops 958 (1 to 10) which comprise the program register, to be reset for programming. All switches on the keyboard are preferably of the momentary type. Now, any band or bands of recorded sound which the operator desires to be played are selected by pushing the appropriate buttons 959 (buttons 1 to 10) on the keyboard. Any switch which is pushed causes an appropriate flip-flop in the program register to be set. (At this stage of the operation sequence, if it is desired to play all of the bands on a side of the record, the "auto" button 972 may be pushed, which simply adjusts all of the flip-flops in the program register to the "high" state. This is done instead of pushing buttons corresponding to individual bands of recorded sound.) The next step is to push the "start" button 974. This sets flip-flop 961 whose output Q goes to "low." The "start" signal also goes through NOR gate 978 and inverter 979 causing flip-flop 963 to be reset. Q of 961 and Q of 963 then go to NOR gate 964 whose output goes high enabling the drive-gates 969 and drive transistors 968 which pulse the clockwise coils 970 of the reversible pulse-motor 386. The pickup arm can now move toward the center of the turntable since the resetting of flip-flop 963 also caused the output of NAND gate 965 to go "high" turning on transistor 966 and thereby activiating solenoid 967 which raises the pickup arm and engages the pickup arm drive clutch 385 (FIG. 3). When the pickup arm passes above the peripheral unrecorded portion of the record, the optical encoder assembly will be in the position of slot 383 (FIG. 3), causing the output of NOR gate 990 in the decoder logic to go "high" since the reflective mode sensor 403 will detect the unrecorded portion, causing the onput of NORGATE 990 in the decoder logic to go "high". The output from FIG. 7 will also go "high" since the sensor 403 will detect the unrecorded portion of the record. This will clock the binary counter 956 causing its count to advance from binary (0000) to (0001). Output line 1 on a 4 to 16 decoder integrated circuit 957 will therefore go high. If the first flip-flop in the program register 958 has been previously set (indicating that band No. 1 is to be played) then all of the inputs to the first comparator NAND gate 992 will be "high" causing its output to go "low" and in turn causing the output of inverter 960 to go high. This will set flip-flop 963 disabling the pulse-motor drive circuit and solenoid 967. The pickup arm will now drop and be free to play the first band of recorded sound. It should be noted at this point that when the pickup arm raising mechanism is deactivated, a viscous damping mechanism should be used to cushion the impact of the stylus on the record.

After the first band of recorded sound has been played, the pickup arm will come to the next unrecorded portion of the record, at which time the output of FIG. 7 will again go "high" clocking the binary counter to the (0010) state. Output line 2 of integrated circuit 957 will go "high" and if the second flip-flop in the program register has been previously set, the output of inverter 960 will go "high" applying this "high" signal to the "set" input of flip-flop 963. Since flip-flop 963 has already been set, it will simply remain in that state, leaving the pickup arm free to play the second band of recorded sound. If, however, when the second unrecorded zone was detected, the second flip-flop in the program register had not been previously set (for example, the turntable had been programmed to skip the second band of sound) the output of inverter 960 will not go high. This will cause the output of inverter 979 to go "high" which will reset flip-flop 963. This will enable the pickup arm raising mechanism and clockwise drive coils 970. This pickup arm will lift from the record and rotate clockwise (radially inwardly) until the unrecorded portion preceding a previously programmed band of the recording is detected, at which time flip-flop 963 will again be set and the pickup arm will be lowered and released to play the desired band. If, instead, there are no more bands of sound which have been programmed to be played, the pickup arm would continue to rotate clockwise above the record until slots 384 of FIG. 3 register with and were detected by the optical encoder 380. When this happens, the output of NAND gate 991 in the decoder logic will go "low" causing the output of NAND gate 976 to go "high" which in turn resets flip-flop 961 and clocks flip-flop 962 to the "high" state. The output of NAND gate 976 can also be forced high at any time by pushing the "stop" button 975. This disables the clockwise drive and enables both the drive to the counter-clockwise coils 971 of pulse-motor 386 and the pickup arm raising solenoid 967. The pickup arm will then lift from or remain elevated above the record and rotate counter-clockwise until the optical encoder senses rest position 382 (FIG. 3). The output of NOR gate 989 in the decoder logic will then go "high", clocking flip-flop 963 to the "high" state and resetting flip-flop 962; which disables flip-flop 963. This disables all of the pulse-motor drive gates 969 and also disables the pickup arm raising mechanism. The pickup arm will therefore drop onto its armrest where it will remain until the next time the "start" button 974 is pushed.

The foregoing programming may be extended to automatic changers where the bands to be played on each record are entered as the respective records are placed on the record stack. The turntable control circuitry should then have an additional counter/register which keeps track of which record is being played. The automatic turntable can then differentiate not only between sound modulated bands on a record, but between individual records as well.

One additional function which may be incorporated, both with respect to automatic record changers and players for individual records, is means for playing the chosen bands of a record over and over as many times as desired. Thus, the control panel 209 may be provided with a times ($x$) button, so that the user might first push the numbers of the desired bands, then push the times button, and finally push the button corresponding to the number of repeat plays desired. Electronically, this can be accomplished by providing another set of counter/registers to keep track of replays made, and consequently, the total replays to be made.

It should be noted that while the sensor 403 has been shown as a photo-transistor of the type described, other sensing means may be employed, including a photo-diode or a photo-diode combined with either a transistor or photo-transistor, with suitable modification of the circuitry without departing from the scope of the invention.

Resort may be had to such further modifications and equivalents as fall within the spirit of the invention and the scope of the appended claims.

What is claimed is:

1. A sound track selector system for a phonograph record player comprising:
    a light emitter and light detecting sensor carried beneath the sound stylus pickup arm, directing light to the face of a phonograph record and receiving reflected light derived from the light emitter along axes substantially perpendicular to said record face and substantially parallel to one another as the emitter and sensor scan the record said sensor also receiving ambient light;
    means for generating pulses to the emitter to alternately turn the emitter on and off;
    two sample-and-hold means which alternately receive and sample the output of the sensor, one for sampling the output when the emitter is on and the other for sampling the output when the emitter if off;
    differential amplifier means receiving the outputs of said sample-and-hold means for substracting the smaller output voltage from the larger and removing the effect of ambient light;
    level detector means for detecting signals from the differential amplifier means representing maximum light reflection from unrecorded bands on the record; and
    control means for positioning the stylus to play any sound-modulated portion of the record in response to a preselected number in a program register and the output of the level detector means as the pickup arm sweeps the record.

2. A system according to claim 1, wherein the emitter emits light primarily in the infrared region of the spectrum and the sensor detects light in substantially all regions of the spectrum, including ambient light.

3. A system according to claim 1, wherein the emitter is a light-emitting diode and the sensor is a photo-transistor spaced apart and transversely aligned with respect to the axis of the pickup arm.

4. A system according to claim 3, wherein the space between the emitter and sensor is no more than about 2 to 3 times the nominal width of the unrecorded bands of the record to be played.

5. A system according to claim 1, wherein the emitter is a light-emitting diode and the sensor is a photo-transistor spaced apart and axially aligned with respect to the axis of the pickup arm.

6. A system according to claim 1, which further comprises a pickup arm drive mechanism comprising a digitally controlled, incremental stepping, reversible pulse-motor connected to a shaft for rotating the pickup arm by means of an electrically actuated clutch.

7. A system according to claim 1, which further comprises an optical encoder assembly beneath a turntable platform and comprising a rotatable disc mounted on a shaft for rotating the pickup arm, said disc being provided with three slots spaced radially from the axis of rotation, and light emitting and detecting means registerable with each said slot to detect the peripheral positions of the pickup arm with respect to the record and thereby transmit to the control means signals indicating the positions of "rest," "first recording," and "return."

8. A system according to claim 1, wherein the emitter is a light emitting diode which is alternately turned on and off by pulses generated by an oscillator which further activate the sample-and-hold means when the emitter is on, and the sensor is a photo-transitor of the photo-Darlington type, and which further comprises means for shortening the oscillator pulses which actuate the light emitting diode to compensate for the longer delay time of the photo-transistor with respect to the light emitting diode.

9. A system according to claim 1, wherein the differential amplifier further comprises variable gain amplifier means for increasing the gain of the differential amplifier means in response to a signal indicating that the pickup arm is elevated and for reducing the gain of the differential amplifier means in response to a signal indicating that the pickup arm is approaching the surface of the record.

10. A system according to claim 1, wherein the control means further comprises counter means responsive to the output of the level detector means for registering which bands of recorded sound are behind or ahead of the pickup arm as it sweeps its arc, and a keyboard programmed register means for preselecting bands of recorded sound to be played and for comparing the logic input of the keyboard with the logic registered on the counter means.

11. In a sound track selector system for a phonograph record player, means for sensing respective bands of recorded and unrecorded sound, comprising a light emitting diode capable of emitting light primarily in the infrared region of the spectrum and a photo-transistor capable of detecting light in substantially all regions of the spectrum, including ambient light, said diode and phototransistor being mounted below the sound-stylus pickup arm and spaced apart in transverse alignment with respect to the axis of the pickup arm and such that the axes of emitted and reflected light are substantially parallel to each other and substantially perpendicular to the face of the record.

12. In a sound track selection system for a phonograph record, means for sensing the peripheral positions of the pickup arm comprising a rotatable shaft for the pickup arm, a disc mounted on said shaft below the turntable platform and rotatable with said shaft, said disc being provided with two slots radially spaced at different distances from the axis of rotation of the disc and one slot radially spaced from the axis of rotation of the disc at substantially the same distances represented by each of the aforesaid two slots, each said slot also being arcuately spaced from one another to represent positions of "rest," "return" and "play" with respect to the pickup arm, and an optical encoder assembly comprising a pair of light emitting diodes and a pair of photo-transistors in fixed position to register with the aforesaid slots and develop a corresponding signal when each said slot is rotated to permit light from a diode to be transmitted to the corresponding photo-transistor sensor, thereby producing a signal representing the position of the pickup arm.

* * * * *